(12) United States Patent
Aoki

(10) Patent No.: US 6,670,561 B2
(45) Date of Patent: Dec. 30, 2003

(54) COORDINATES INPUT METHOD

(75) Inventor: Toshio Aoki, Saitama (JP)

(73) Assignee: Wacom Co., Ltd., Saitama-ken (JP)

( * ) Notice: Subject to any disclaimer, the term of this patent is extended or adjusted under 35 U.S.C. 154(b) by 104 days.

(21) Appl. No.: 09/925,930

(22) Filed: Aug. 10, 2001

(65) Prior Publication Data

US 2002/0080124 A1 Jun. 27, 2002

(51) Int. Cl.[7] ................................................. G09G 5/00
(52) U.S. Cl. ..................................... 178/18.01; 345/156
(58) Field of Search ................................. 345/156, 173, 345/179; 178/18.01, 20.01

(56) References Cited

U.S. PATENT DOCUMENTS

| | | | | |
|---|---|---|---|---|
| 5,239,489 A | * | 8/1993 | Russell ........................ | 701/37 |
| 5,763,839 A | * | 6/1998 | Funahashi et al. .......... | 177/147 |
| 5,969,712 A | * | 10/1999 | Morita et al. ............... | 345/179 |
| 6,122,538 A | * | 9/2000 | Sliwa et al. ................. | 600/407 |
| 6,246,393 B1 | * | 6/2001 | Watanabe et al. ........... | 345/173 |

* cited by examiner

Primary Examiner—Amare Mengistu
(74) Attorney, Agent, or Firm—Liniak, Berenato & White, LLC

(57) ABSTRACT

Digitizer pointer position data corresponds to the absolute coordinates of a digitizer tablet having coordinate axes, and so when a user wishes to use a digitizer pointer like a mouse, different procedures are imposed on the user, sometimes requiring unnatural hand movements. A psuedomouse coordinate input method consists of providing a digitizer or coordinate input system having a coordinates indicator (e.g., a puck) for manipulation by a user, a tablet which detects the position of the coordinates indicator, and a host computer connected to the tablet to receive the output of the tablet. When the user grasps and moves the coordinates indicator, a coordinate information detecting step occurs which causes the coordinates indicator's position to be detected by the tablet, and the tablet then generates coordinate information data including coordinate values of the coordinates indicator on the tablet before and after its movement or displacement. During a data transmission step, the coordinate indictor position data is transmitted to the host computer by the tablet. During a psuedomouse coordinate data acquisition step, the coordinates indicator position data is received by the host computer and utilized as data while each of the coordinate axes of the coordinate indicator are designated as standards. Self referenced or relative psuedo-mouse coordinates are computed from the position data corresponding to the coordinate axes of the designated standard, which are necessarily provided in the absolute coordinates of the digitizer tablet.

8 Claims, 6 Drawing Sheets

COORDINATES INPUT METHOD

CROSS-REFERENCE TO RELATED APPLICATIONS:

This application claims benefit of the filing date of Japanese Patent Number 000139403.

BACKGROUND OF THE INVENTION (1) Field of the Invention

The present invention concerns a coordinates input method for a coordinates input device (i.e., digitizer or tablet) which detects the position of a position indicator by utilizing electromagnetic induction and then inputs it into a host computer.

(2) Description of Related Art

The electromagnetic induction format has been known with regard to coordinates input devices for computers, etc. in the prior art. Such a coordinates input device based on the electromagnetic induction format consists of a tablet on which multiple loop coils are configured and a coordinates indicator. Upon the retention and displacement of the coordinates indicator by an operator on a tablet, the concomitantly indicated position is detected by the tablet and then inputted into a computer of a higher order.

The coordinates indicators used for the tablet of the prior art based on the electromagnetic induction format will be explained with reference to FIGS. 4(a) and 4(b). FIG. 4 (a) is a diagram which shows a transparentized plane view of the internal structure of the tablet (420). FIG. 4 (b) is a diagram that shows a longitudinal cross-sectional view of the coordinates indicator (440). The coil (441), which the coordinates indicator (440) possesses, is driven by the oscillator (443) under the pervasion of an alternate current whose frequency is F1, resulting in the generation of a magnetic field. (444) signifies a battery that feeds an electric power into the oscillation circuit (443). The coordinates indicator is normally equipped also with a switch, etc. for obtaining information other than the coordinates value, although they are omitted from FIG. 4 in that they are not directly related to the present invention.

As FIG. 4 (a) indicates, a group of loop coils CX1, CX2, CX3, . . . CXm, which are extended along the longitudinal direction (i.e., longitudinally expansive), are configured along the lateral direction (i.e., X direction) on the tablet (420). Only CX1 and CXm are drawn in FIG. 4 (a) for avoiding convolutions. Another group of loop coils CY1, CY2, CY3, . . . CYn, which are extended along the lateral direction (i.e., laterally expansive), furthermore, are configured along the longitudinal direction. Only CY1 and CYn are drawn in FIG. 4 (a) for avoiding convolutions. The respective numbers of the concomitantly configured loop coil groups depend on the size of the tablet.

The switch (421) in FIG. 4 (a) is a switch for selecting one coil from a group of multiple members, and the coil which has been selected by said switch becomes connected to the signal detection circuit (422). The position of the coil (441) on the tablet (420) is calculated by the computation circuit (423) based on the output of the detection circuit (422). The calculated position is normally transferred to a host computer, etc., although the corresponding block is omitted from the figure. A battery or external power source, furthermore, is used as a power source, although it is omitted from the figure.

In a case where the operator has placed the coordinates indicator (440) on the tablet (420) discussed above, for example, the magnetic field which has been generated by the coil (441) of the coordinates indicator (440) induces a higher voltage in relation to a loop coil of the tablet coil group closer to the coil (441) and a lower voltage in relation to a loop coil farther from it. In a case where the respective induction voltages are detected by sequentially switching the coils of the tablet via the switch (421), therefore, the respective distributions shown in FIG. 6 (a) and FIG. 6 (b) can be obtained along the longitudinal and lateral directions. The longitudinal and lateral positions of the coil (441) on the tablet can be discerned by calculating their output values by using the computation circuit (423). The positions of the coordinate indicator (440) can therefore be discerned in a case where the coordinate indicator (440) is retained above the tablet by the operator, whereas in a case where it is displaced while being continuously retained, the coordinates on the line of displacement can be obtained.

BRIEF SUMMARY OF THE INVENTION

Incidentally, cases where coordinates variation magnitudes (i.e., relative coordinates) are utilized by host computers instead of the direct utilization of the coordinates (i.e., absolute coordinates) are conceivable. In such a case, a coordinates indicator may be used in place of a mouse, which represents another type of input machine. In this case, the coordinates indicator of the tablet is often referred to as a "pseudomouse."

In a case where the coordinates indicator of the tablet is utilized as such a pseudomouse, operative procedures identical to those for handling a mouse do not suffice, and therefore, slightly different operative procedures are imposed on the operator. This topic will be explained with reference to FIG. 5. Of said FIG. 5, the display contents of the display device (550) which are used for ordinary computers are shown in (a), whereas the movements of the coordinates indicator (540) above the tablet (520) are shown in (b). The tablet is normally used while being fixed to the top of a desk, whereas the coordinates indicator (540) is routinely operated while being held in the operator's hand.

In the context of inducing the displacement of an indicated point on the display device (50), the coordinates indicator (540) must be displaced while being aligned against the coordinates axes of the tablet (520) (i.e., XY rectangular coordinates axes) regardless of the pervasion of an absolute coordinates system or relative coordinates system. In other words, to illustrate with reference to an easy-to-understand example, in a case where an attempt is made to induce a parallel displacement of the indicated point on the display device (550), the coordinates indicator (540) must also be displaced in parallel to the tablet while being positioned above said tablet. For this reason, the operator is forced to displace the coordinates indicator (40) while its disposition is being matched with that of the tablet, as a result of which unnatural hand movements may become required in some cases. In other words, the coordinates axes of the plane of the coordinates indicator (40) coincide with the coordinates axes on the tablet plane, and therefore, the coordinates indicator (40) must be displaced while its disposition is being aligned against the coordinates axes of the tablet plane.

In a case where an attempt is made to displace the indicated point (i.e., mouse pointer) from point A1 to point A2 on the display device (550), for example, it is necessary to displace the coordinates indicator (540) on the tablet from point B1 to point B2.

Regardless of the size disparity between the display device (550) and tablet (520), the dispositions of the respective coordinates axes of the display device (550) and tablet (520) are exactly the same, and therefore, a parallel displacement on the display device (550) is articulated by displacing the coordinates indicator (540) in parallel to the tablet (520) while being positioned above said tablet (520) as well. Even in the cases of non-parallel lines and curves, therefore, the coordinates indicator (540) must be displaced in compliance with the coordinates axes of the tablet (520).

One difference from the mouse operation method known in the prior art has been thus articulated. The mouse has no equivalency to the tablet (520). The mouse is therefore a machine which enables the input of a coordinates displacement magnitude in compliance with the coordinates axes of itself, namely the mouse.

The objective of the present invention is to provide a coordinates input method which is capable of solving the problem of the pseudomouse.

Mechanism for Solving the Problems

The following constitution is provided by the coordinates input method of the present invention in order to solve the problem cited above: In a coordinates input system which consists of a coordinates indicator, a tablet which detects the position indicated by said coordinates indicator, and a host computer which obtains the coordinates data outputted by said tablet, the following are orchestrated: A coordinates indicator information detection step at which, upon the retention and displacement of said coordinates indicator on said tablet by an operator, coordinates indicator information data which include the coordinates values of said coordinates indicator on said tablet before and after its displacement as well as the disposition of said coordinates indicator are detected by said tablet, a data transmission step at which said coordinates indicator information data which have been detected at said coordinates indicator information detection step are transmitted to said host computer by said tablet, and an indicator coordinates axis standard data acquisition step at which said coordinates indicator information is taken into said host computer and then utilized as data while each of the coordinates axes of said coordinates indicator is being designated as a standard.

In an alternative embodiment, a pair of coils for emitting an alternate magnetic field are configured on the aforementioned coordinates indicator while being mutually separated via a distance, whereas multiple loop coils for receiving the alternate magnetic field obtained from said coordinates indicator are configured on the aforementioned tablet, whereas the aforementioned coordinates indicator information detection at the aforementioned coordinates indicator information detection step is enabled by amplifying and computing the signals received by the aforementioned multiple loop coils and by thus obtaining the positions of said pair of coils within said coordinates indicator.

In another alternative embodiment, a pair of coils are configured on the aforementioned coordinates indicator while being separated via a certain distance, whereas the aforementioned tablet possesses multiple loop coils, whereas an alternate magnetic field is emitted toward said coordinates indicator from said multiple loop coils, whereas an induction current is generated based on an electromagnetic induction effect exerted on said pair of coils within said coordinates indicator by said alternate magnetic field, whereas the detection of the aforementioned coordinates indicator information at the aforementioned coordinates indicator information detection step is enabled based on the acquisition of the positions of said pair of coils upon the reception, amplification, and computation of a magnetic field generated under the pervasion of said induction current by said tablet.

In still another alternative embodiment, the data transmitted at the aforementioned data transmission step include coordinates data on the positions of the aforementioned pair of coils in relation to tablet coordinates axes, whereas the aforementioned indicator coordinates axis standard data acquisition step is implemented by converting the coordinates value of the aforementioned coordinates indicator in relation to the coordinates axes of said tablet into the displacement magnitude of the coordinates indicator in relation to the coordinates axes of said coordinates indicator based on a routine ascribed to a software program memorized into a memory of the aforementioned host computer.

DETAILED DESCRIPTION OF THE INVENTION

Application Embodiment

Figure 1A:
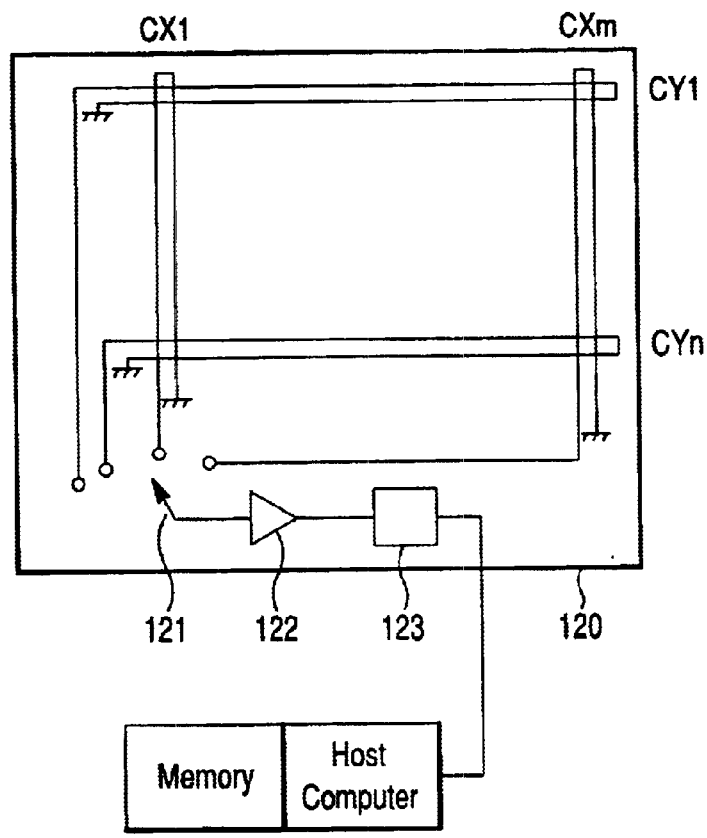
FIG. 1(a) is a diagram which shows a transparentized plane view of the internal structure of the tablet (120), in accordance with the present invention.
Figure 1B:
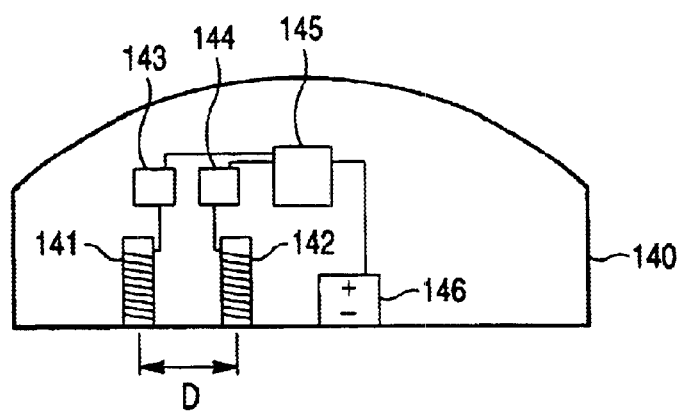
FIG. 1(b) is a diagram which shows a profile cross-sectional view of a coordinates indicator, in accordance with the present invention.

In the following, an application embodiment of the present invention will be explained with reference to FIGS. 1(a) and 1(b). FIG. 1(a) is a diagram which shows a transparentized plane view of the internal structure of the tablet (120). FIG. 1(b) is a diagram which shows a profile cross-sectional view of a coordinates indicator.

The coordinates indicator (140) possesses the first coil (141) and the second coil (142), which are mutually apart via a gap of the distance D, and they generate a magnetic field while being respectively driven alternately by a pair of oscillators (143) and (144) at AC frequencies of F1 and F2.

The oscillators (143) and (144) are turned ON/OFF over time under the control of the control circuit (145). The battery (146) is a battery which feeds an electric power into the oscillators (143) and (144) as well as the control circuit (145). The coordinates indicator is normally equipped also with a switch, etc. for obtaining information other than coordinates values, although they are hereby omitted, as in the case of the explanation of the "prior art."

A group of multiple coils CX1, CX2, CX3, . . . CXm, which are stretched along the lateral direction (X direction) as longitudinally expansive loop coils, and another group of multiple coils CY1, CY2, CY3, . . . CYn, which are stretched along the longitudinal direction (Y direction) as laterally expansive loop coils, are configured on the tablet (120). The switch (121) is a switch for selecting one coil from a group of multiple members. The coil which has been selected by the switch (121) is connected to the detection circuit (122). The respective positions of the coils (141) and (142) on the tablet (120) are calculated by the computation circuit (123). A block for transferring the calculated positions to the host computer, etc. and a power source block are normally necessary, although they are hereby omitted, as in the aforementioned case of the explanation of the "prior art."

As has been discussed with regard to the explanation of the "prior art," furthermore, in a case where the coordinates indicator (140) is placed above the tablet (120), the magnetic field which has been generated by the coil (141) of the coordinates indicator (140) induces a higher voltage in relation to a coil of the tablet coil group closer to the coil (141) and a lower voltage in relation to a loop coil farther from it, based on which, the position of the coil (141) on the tablet (120) can be accurately discerned. The position of the coil (142) on the tablet can likewise be discerned.

In a case where the respective positions of the coil (141) and coil (142) on the tablet have thus been discerned, the rotation angle of the coordinates indicator (140) in relation to the tablet (120) along the horizontal directions can be discerned. In other words, in a case where the respective lateral and longitudinal coordinates values of the coil (141) are defined as (X11,Y11) and where the respective lateral and longitudinal coordinates values of the coil (142) are defined as (X12,Y12), the horizontal rotation angle of the coordinates indicator (140) in relation to the tablet (120) is 0, which is tantamount to the straightforward placement of the coordinates indicator (140) on the tablet (120). In other cases, the horizontal tilt θ of the coordinates indicator (40) in relation to the tablet (20) is calculated by using the following numerical formula: $\tan\theta=(Y12-Y11)\div(X12-X11)$. Coordinates input devices which are thus capable of yielding the rotation θ have been known in the prior art. The present invention is peculiarly characterized as follows.

As far as the present invention is concerned, the coordinates displacement magnitudes on the tablet are converted into the coordinates displacement magnitudes specific to the coordinates axes of the coordinates indicator (140) by the computation circuit (123) based on the obtained θ, namely the obtained distortion between the coordinates axes of the tablet (120) and the coordinates axes of the coordinates indicator (140). It is thus that coordinates and coordinates displacement magnitudes can be inputted in accordance with the disposition of the coordinates indicator during a coordinates input operation.

Figure 2A:
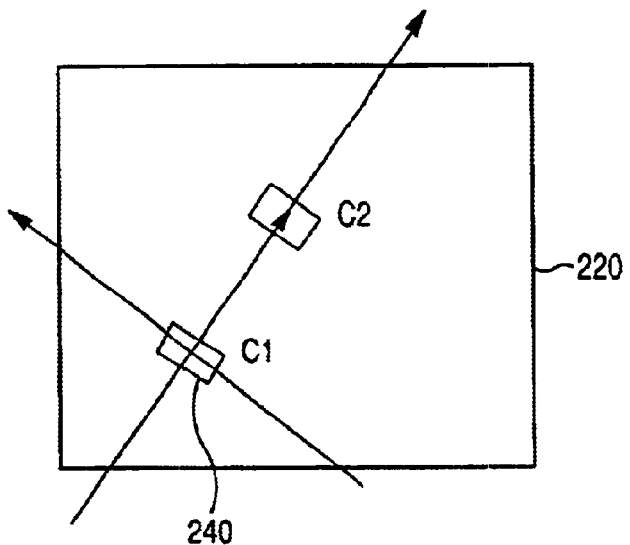
FIGS. 2(a) and 2(b) are diagrams illustrating the relationship between the tablet (220) and the display device (250) in a case where the coordinates input method of the present invention is implemented.
Figure 2B:
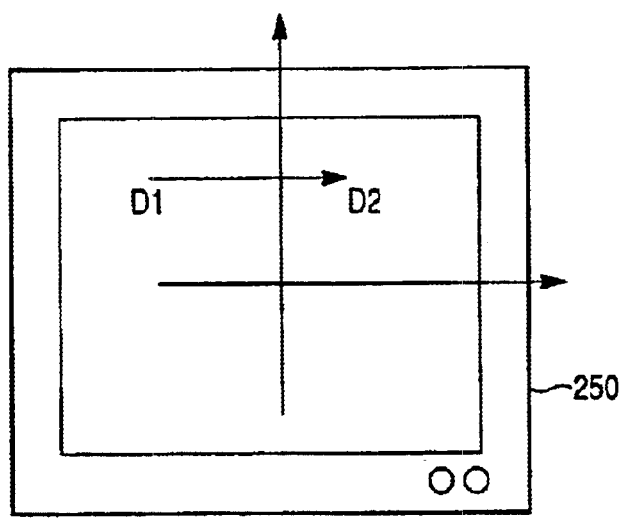

The foregoing attribute will be further explained with reference to FIG. 2. FIG. 2 are provided for explaining the relationship between the tablet (220) and the display device (250) in a case where the coordinates input method of the present invention is implemented.

In a case where the coordinates indicator (240) is hereby assumed to be displaced from point C1 to point C2, the indicated point of the display device (250) (i.e., mouse pointer) becomes displaced from point D1 to point D2. In other words, the coordinates displacement may be assumed to have occurred in relation to the coordinates axes of the coordinates indicator (240) rather than to the coordinates axes of the tablet (220). Based on such a constitution, the operator can afford to overlook the mutual dispositional disparity and tilt of the tablet (220) and coordinates indicator (240) unless the coordinates indicator (240) exceeds the outer boundaries of the tablet (220) while the displacement of the coordinates indicator (240) alone is being emphasized during the operation. For this reason, a coordinates input operation can be carried out easily based on natural actions in comparison with the prior art. It also means that operative procedures extremely analogous to those for operating the mouse of the prior art are enabled.

Figure 3A:
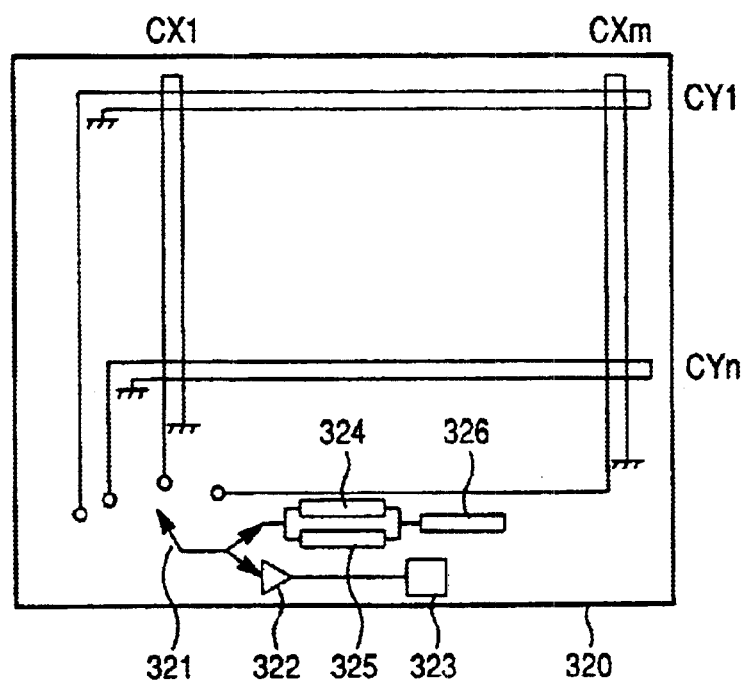
FIGS. 3(a) and 3(b) illustrate a battery-free application example, in accordance with the method and apparatus of the present invention.
Figure 3B:
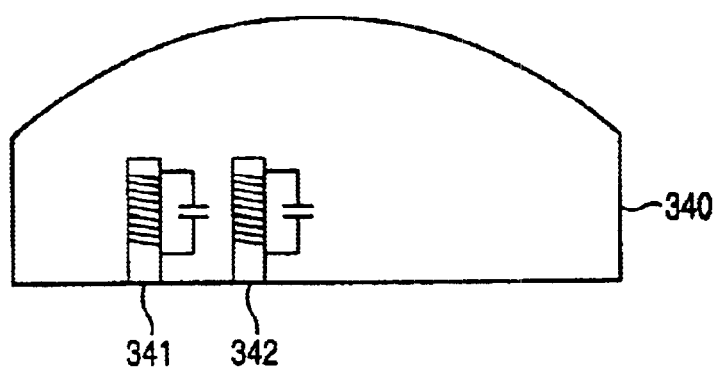
Figure 4A:
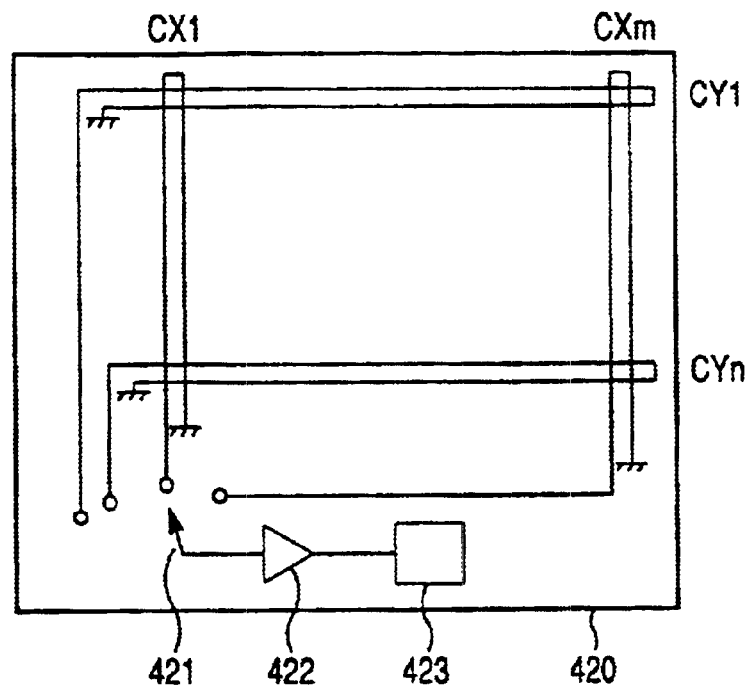
FIG. 4(a) is a diagram that shows a transparentized plane view of the internal structure of the tablet (420).
Figure 4B:
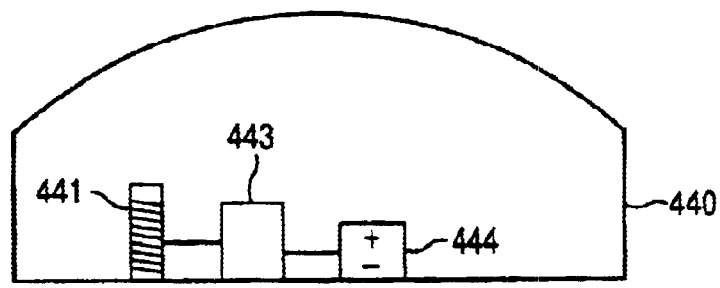
FIG. 4(b) is a diagram that shows a longitudinal cross-sectional view of the coordinates indicator (440).
Figure 5A:
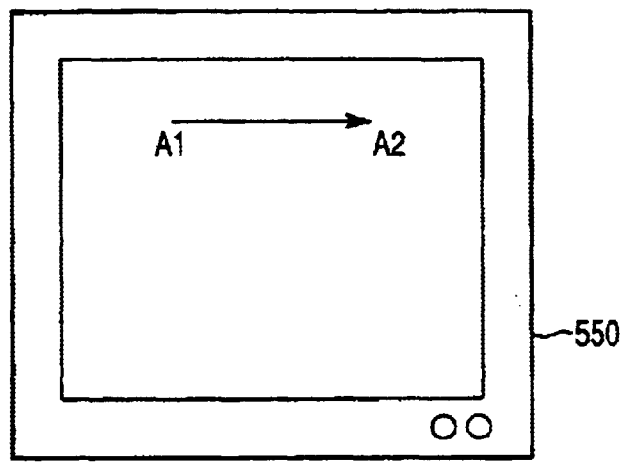
FIG. 5(a) illustrates the display contents of the display device (550), which is used for an ordinary computer, in accordance with the method of the present invention.
Figure 5B:
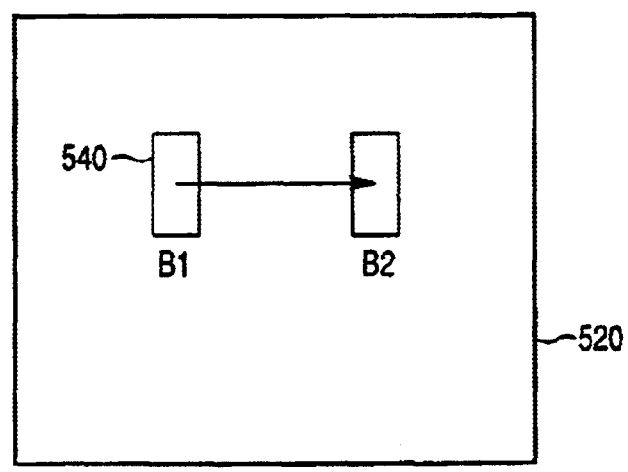
FIG. 5(b) illustrates the motions of the coordinates indicator (540) on the tablet (520) which result in the change displayed in FIG. 5(a).
Figure 6A:
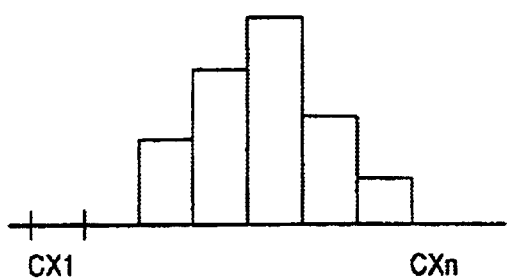
FIGS. 6(a) and 6(b) are diagrams illustrating variations in the respective induction voltages detected by sequentially switching the coils of the tablet via the switch (421); the respective distributions shown in FIG. 6(a) and FIG. 6(b) can be obtained along the longitudinal and lateral directions, respectively.
Figure 6B:
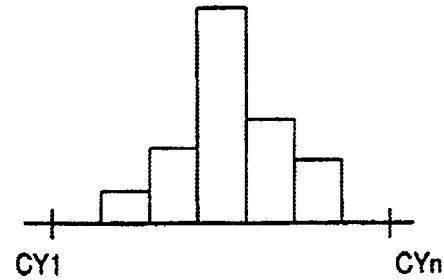

Application Examples (Battery-free case): One application embodiment of the present invention has been shown above. Another application example will be explained with reference to FIG. 3. In FIG. 3, (320) and (340) signify a tablet and a coordinates indicator, respectively. The coordinates indicator (340) is constituted to possess a resonant circuit which includes the coil (341) and the coil (342), which are mutually apart via a gap of the distance D, and they resonate at the respective frequencies of F1 and F2. Neither the pair of oscillators nor the battery orchestrated for the example of FIG. 1 are hereby included. The coordinates indicator, furthermore, is normally also equipped with a switch, etc. for obtaining information other than coordinates values, although they are omitted from said figures, as in the case of the example of FIG. 1.

A group of multiple coils CX1, CX2, CX3, . . . CXm, which are stretched along the lateral direction (X direction) as longitudinally expansive loop coils, and another group of multiple coils CY1, CY2, CY3, . . . CYn, which are stretched along the longitudinal direction (Y direction) as laterally expansive loop coils, are configured on the tablet (20): Presumably "(320)"]. The switch (321) is a switch for selecting one coil from a group of multiple members. The coil which has been selected by the switch (321) is connected to the detection circuit (322). Furthermore, (323) is a computation circuit, and the position of the coil (341) or coil (342) on the tablet (320) is calculated by it. This embodiment differs from the application embodiment [of FIG. 1] in that the tablet (320) is constituted to possess the oscillator (324), which oscillates the frequency F1, the oscillator (325), which oscillates the frequency F2, and the control circuit (326), which switches between said pair of oscillators. The switch (327) serves a function of switching connections among the coil group, oscillators (324) and (325), and the detection circuit (322). A block for transferring the coordinates values to the host computer, etc. and a power source block are hereby omitted, as in the case of the application embodiment of FIG. 1.

As far as the present application example is concerned, a magnetic field is generated from the tablet by alternately feeding currents the frequencies of which are F1 and F2 into the coil group from the oscillators (324) and (325). Depending on the differential between the frequencies F1 and F2, an induction current is incurred by either the coil (341) or (342) of the coordinates indicator (340) under the pervasion of this magnetic field. This induction current is not reduced to zero immediately after the oscillators (324) and (325) have been stopped, and therefore, it remains continuously permeated through said coil for a while. The reason is because said coils constitute a resonant circuit. In a case where the switch (327) of the tablet (320) is permutated to the detection circuit (322) upon the invocation of the coil transmission action of either the coil (341) or (342), the magnetic field attributed to the induction current of the coil (341) or (342) can be detected, and therefore, the respective positions of the coil (341) and the coil (342) can be ascertained by alternating the transmission and reception of F1 and the transmission and reception of F2 vis-à-vis the tablet, as in the case of the aforementioned embodiment.

This embodiment of the present invention can subsequently be [completed] by calculating the horizontal tilt θ of the coordinates indicator (40) vis-à-vis the tablet (20) and by converting it into a coordinates displacement magnitude specific to the coordinates axes of the coordinates indicator (40), as in the first application example.

As the foregoing explanations have demonstrated, the present invention provides a coordinates input method that can be easily implemented and entails less fatigue than coordinates input methods of the prior art.

As far as the first application embodiment of this invention as well as the application example shown above are concerned, the conversion of the coordinates displacement magnitude specific to the coordinates axes of the tablet into the coordinates displacement magnitude specific to the coordinates axes of the coordinates indicator is executed by the computation circuit of said tablet in the application example, although the corresponding routine may also be executed by a so-called "driver," which is operated while being internalized in a memory which belongs to the host computer.

Effects of the Invention

As the foregoing explanations have demonstrated, the present invention provides a coordinates input method the operative efficiency of which is superior to those of its counterparts of the prior art.

Explanation of the Notations

In the Figures, those items identified with reference numbers (120), (220), (320), (420) and (520): are, and those items identified with reference numbers (140), (240), (340), (440) and (540) are coordinates indicators.

It will be appreciated by those skilled in the art that the present invention makes available a coordinates input method that enables a relative coordinates input while the disposition of a coordinates indicator is being designated as a standard in a case where a coordinates indicator designed for a tablet based on the electromagnetic induction format is used as a pseudomouse.

Solution mechanism: In a coordinates input system that consists of a coordinates indicator, a tablet that detects the position indicated by said coordinates indicator, and a host computer that obtains the coordinates data outputted by said tablet, the following are orchestrated: A coordinates indicator information detection step at which, upon the retention and displacement of said coordinates indicator on said tablet by an operator, coordinates indicator information data that include the coordinates values of said coordinates indicator on said tablet before and after its displacement, as well as the disposition of said coordinates indicator, are detected by said tablet, a data transmission step at which said coordinates indicator information data, which have been detected at said coordinates indicator information detection step, are transmitted to said host computer by said tablet, and an indicator coordinates axis standard data acquisition step at which said coordinates indicator information is taken into said host computer and then utilized as data, while each of the coordinates axes of said coordinates indicator is being designated as a standard.

What is claimed is:

1. A method for generating a pseudomouse pointer signal when using a digitizer or tablet having arrays of orthogonal sensing coils corresponding to standard or absolute position coordinates rather than relative movement coordinates, as are customarily used with a mouse pointer, comprising the method steps of:

(a) providing a coordinate input system which consists of (i) a movable coordinates indicator adapted to be grasped and displaced by a user's hand, (ii) a tablet having arrays of orthogonal sensing coils corresponding to absolute position coordinates, said tablet configured to detect the position of said movable coordinates indicator and to generate a position data signal in response thereto, and (iii) a host computer responsive to said tablet position data signal for generating a display signal;

(b) detecting the initial position of said movable coordinates indicator on said tablet before any displacement of said movable coordinates indicator by the user and generating an initial position data signal in response thereto;

(c) displacing said movable coordinates indicator across the tablet;

(d) sensing said displacement of said movable coordinates indicator with said tablet sensing coils;

(e) sensing a disposition of said movable coordinates indicator on said tablet after displacement of said movable coordinates indicator by the user, and, in response, generating an after displacement position data signal corresponding to the coordinate values of said movable coordinates indicator on said tablet after displacement of said movable coordinates indicator by the user;

(f) transmitting said initial position data signal to said host computer from said tablet;

(g) transmitting said after displacement position data signal to said host computer from said tablet; and (h) computing relative pseudomouse movement coordinates from (i) the absolute tablet coordinates, (ii) the initial position data and (iii) the after displacement position data.

2. The method of claim 1, wherein:

method step (a) further comprises (a2) providing, in said movable coordinates indicator, a first coil and a second coil for emitting an alternating magnetic field; said first and second coils being mutually separated by a selected distance; and (a3) generating an alternating magnetic field in said movable coordinates indicator; and wherein detecting step (b) comprises (b1) detecting, in said tablet sensing coils, said alternating magnetic field generated by said movable coordinates indicator by amplifying the signals received in said tablet sensing coils; and (b2) computing initial position data and generating initial position data signals for each of said first and second movable coordinates indicator coils, whereby the rotational orientation of said movable coordinates indicator may be determined.

3. The method of claim 2, wherein said data transmission step (f) comprises transmitting initial position data signals for each of said first and second movable coordinates indicator coils to said host computer from said tablet, and wherein computing step (g) comprises computing the relative pseudomouse movement coordinates by executing a software program stored in a memory of said host computer.

4. The method of claim 1, wherein:

method step (a) further comprises (a2) providing, in said movable coordinates indicator, a first coil and a second coil for sensing a magnetic field; said first and second coils being mutually separated by a selected distance;

(a3) providing, in said tablet, at least first and second multiple loop coils;

(a4) emitting an alternating magnetic field from said tablet multiple loop coils to excite said movable coordinates indicator first coil and second coil, and, in response, (a5) generating an induction current based on an electromagnetic induction effect exerted within said movable coordinates indicator first coil and second coil by said alternating magnetic field; and wherein method step (b) comprises (b1) detecting said movable coordinates indicator first coil induction current and said movable coordinates indicator second coil induction current, and generating an amplified coordinate indicator position signal in response thereto; and (b2) computing the initial location and rotational orientation of said movable coordinates indicator from said amplified coordinate indicator position signal and generating an initial position data signal in response thereto.

5. The method of claim 4, wherein said data transmission step (f) comprises transmitting coordinate data for said initial location of said movable coordinates indicator to said host computer from said tablet, and wherein computing step (g) comprises computing the relative pseudomouse movement coordinates by executing a software program stored in a memory of said host computer.

6. A method for generating a pseudomouse pointer signal when using a digitizer or tablet having arrays of orthogonal sensing coils corresponding to standard or absolute position coordinates rather than self-referenced or relative movement coordinates, as are customarily used with a mouse pointer, comprising the method steps of:

(a) providing a coordinate input system which consists of (i) a movable coordinates indicator adapted to be grasped and displaced by a user's hand and including a first coil and a second coil for sensing a magnetic field; said first and second coils being mutually separated by a selected distance, (ii) a tablet having arrays of orthogonal sensing coils corresponding to absolute position coordinates, said tablet configured to detect the position of said movable coordinates indicator and to generate a position data signal in response thereto, and (iii) a host computer responsive to said tablet position data signal for generating a display signal;

(b) emitting an alternating magnetic field from said tablet orthogonal coils to excite said movable coordinates indicator first coil and second coil, and, in response, (c) generating an induction current based on an electromagnetic induction effect exerted within said movable coordinates indicator first coil and second coil by said alternating magnetic field; and (d) detecting the initial position and angular orientation of said movable coordinates indicator on said tablet before any displacement of said movable coordinates indicator by the user and generating an initial position data signal in response thereto.

7. The method for generating a pseudomouse pointer signal of claim 6, further comprising the steps of:

(e) displacing said movable coordinates indicator across the tablet;

(f) sensing said displacement of said movable coordinates indicator with said tablet sensing coils; and (g) sensing a final disposition and angular orientation of said movable coordinates indicator on said tablet after displacement of said movable coordinates indicator by the user, and, in response, generating an after displacement position data signal corresponding to the coordinate values of said movable coordinates indicator on said tablet after displacement of said movable coordinates indicator by the user.

8. The method for generating a pseudomouse pointer signal of claim 7, further comprising the steps of:

(h) transmitting said initial position data signal to said host computer from said tablet;

(i) transmitting said after displacement position data signal to said host computer from said tablet; and (k) computing relative pseudomouse movement coordinates from (i) the absolute tablet coordinates, (ii) the initial position data and (iii) the after displacement position data.

* * * * *